United States Patent [19]

Harris

[11] Patent Number: 4,724,705

[45] Date of Patent: Feb. 16, 1988

[54] FUEL GAUGE

[75] Inventor: Robert S. Harris, Connersville, Ind.

[73] Assignee: Stant Inc., Connersville, Ind.

[21] Appl. No.: 846,073

[22] Filed: Mar. 31, 1986

[51] Int. Cl.$^4$ .................................................. G01F 23/24
[52] U.S. Cl. ........................................ 73/313; 73/304 R; 338/33
[58] Field of Search ................... 73/313, 308, 304 R; 338/33

[56] References Cited

U.S. PATENT DOCUMENTS

| | | | |
|---|---|---|---|
| 2,648,982 | 8/1953 | Condom | 361/284 X |
| 2,752,543 | 6/1956 | Smith | 73/304 C |
| 3,470,744 | 10/1979 | Lindberg | 374/115 X |
| 3,842,673 | 10/1974 | Riddel | 338/33 X |
| 4,052,901 | 10/1977 | Bjork | 73/313 |
| 4,139,750 | 2/1979 | Rau | 200/84 |
| 4,142,415 | 3/1979 | Jung et al. | 73/304 |
| 4,178,802 | 12/1979 | Yamamoto | 73/313 |
| 4,184,369 | 1/1980 | Jung et al. | 73/304 |
| 4,184,370 | 1/1980 | Schlick et al. | 73/313 |
| 4,204,427 | 5/1980 | Gothe et al. | 73/304 |
| 4,231,250 | 11/1980 | Leber | 73/290 |
| 4,294,108 | 10/1981 | Sauerschell et al. | 73/119 |
| 4,296,630 | 10/1981 | Jung et al. | 73/304 |
| 4,352,289 | 10/1982 | Stier et al. | 73/114 |
| 4,361,037 | 11/1982 | Hauschild et al. | 73/295 |
| 4,418,569 | 12/1983 | Kuhnel | 73/304 |
| 4,425,795 | 1/1984 | Albrecht et al. | 73/295 |
| 4,461,175 | 7/1984 | Baumgart et al. | 73/295 |
| 4,466,282 | 8/1984 | Kuhnel | 73/295 |
| 4,467,646 | 8/1984 | Berryman et al. | 73/304 |
| 4,532,491 | 7/1985 | Rau et al. | 338/33 |
| 4,562,734 | 1/1986 | Kobayashi | 73/313 X |
| 4,567,762 | 2/1986 | Hoppert et al. | 73/304 R |
| 4,646,569 | 3/1987 | Cosser | 73/304 R |

Primary Examiner—Daniel M. Yasich
Attorney, Agent, or Firm—Barnes & Thornburg

[57] ABSTRACT

An apparatus is provided for determining the quantity of fuel in a fuel tank having a contoured interior wall. The apparatus includes a buoyant member for floating on the top surface of fuel in the fuel tank, a conductor supported on the buoyant member to float therewith, and a pattern of resistance in electrical contact with the floating conductor. The pattern of resistance is selected to correspond to the contour of the interior wall. Thus, the resistance pattern is coded to represent the volume profile of the fuel tank. A voltage is applied across the conductor and the pattern of resistance. The floating conductor and the pattern of resistance cooperate to provide a value of resistance corresponding to the depth of fuel in the fuel tank at the measurement location. An indicator interprets that value of resistance to determine the instantaneous quantity of fuel in the fuel tank.

21 Claims, 7 Drawing Figures

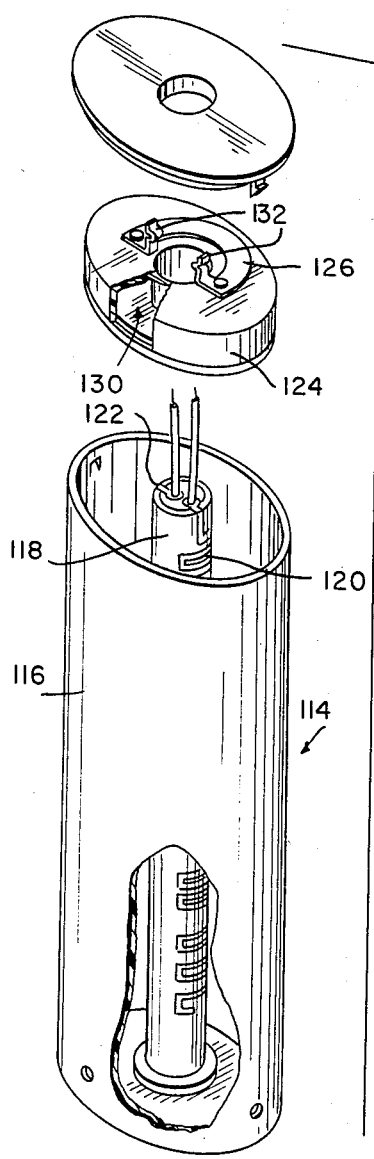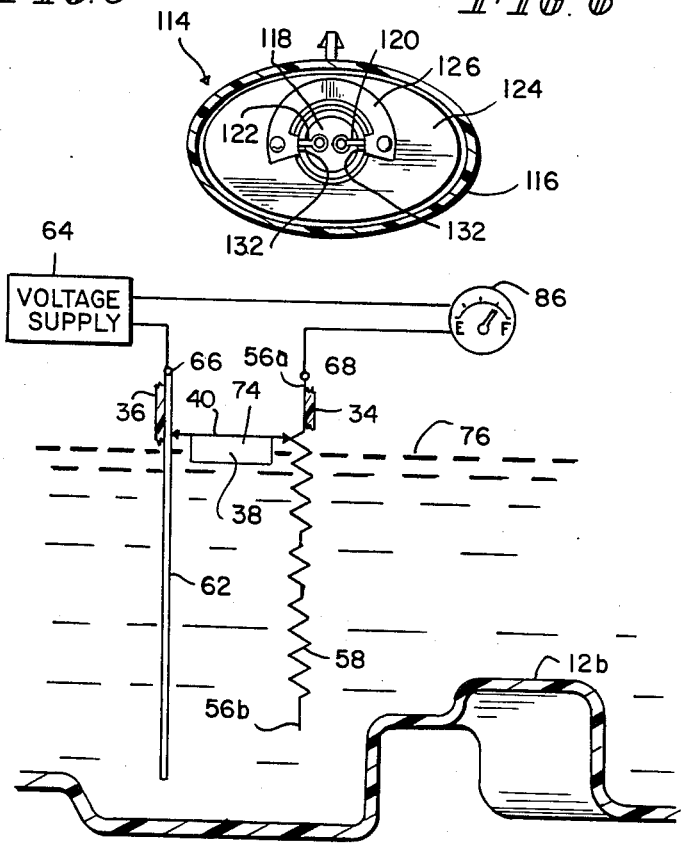
FIG. 5
FIG. 6
FIG. 7

FUEL GAUGE

BACKGROUND AND SUMMARY OF THE INVENTION

This invention relates to fuel-measurement devices, and particularly to a device for determining the quantity of fuel in a fuel tank. More particularly, this invention relates to a non-linear fuel-level indicator that is movable within the fuel tank and has a continuity circuit that includes a coded resistance pattern representative of internal fuel tank dimensions and a buoyant continuity bridge for short-circuiting the coded resistance pattern to provide a value of resistance indicative of the fuel level and the corresponding instantaneous fuel volume in the fuel tank.

Known fuel gauges having a continuity circuit and a floating fuel depth sensor generally provide only a linear model of the "volume profile" (i.e. internal dimensions) of the fuel tank. Although such a system is able to indicate generally the presence of fuel in the fuel tank, the indication does not provide extremely accurate information regarding the exact quantity of fuel remaining in the fuel tank, especially at very low fuel levels and in a fuel tank having a non-linear volume profile. Vehicle operators will appreciate the fuel-management problems associated with these known linear fuel gauges.

One object of the present invention is to provide a fuel gauge that is able to measure accurately the quantity of fuel in a fuel tank in which the quantity of fuel therein varies in non-linear relation to the depth of fuel within the fuel tank due to a non-linear volume profile of the fuel tank.

Another object of the present invention is to provide a fuel gauge that is able to measure most accurately the remaining quantity of fuel in the fuel tank at very low fuel levels. At that stage, information regarding available fuel supplies is of critical importance to a fuel consumer and must be monitored and determined with substantial accuracy to guard against unexpected fuel shortages.

In accordance with the present invention, an apparatus is provided for determining the quantity of fuel in a fuel tank having a contoured interior wall. The quantity of fuel in the fuel tank is defined by the contour of the interior wall below the top surface of the fuel in the fuel tank. The apparatus includes means for measuring the depth of fuel at a measurement location within the fuel tank and providing a value of resistance indicative of the measured depth, and indicator means for interpreting the resistance provided by the measuring means to determine the instantaneous quantity of fuel in the fuel tank.

The measuring means includes a buoyant member for floating on the top surface of fuel in the fuel tank, a conductor supported on the buoyant member to float therewith, and a pattern of resistance in electrical contact with the floating conductor. The pattern of resistance is selected to correspond to the contour of the interior wall. Thus, the resistance pattern is coded to represent the volume profile of the fuel tank. The coded resistance pattern is selected to represent the variation in the volume of the fuel tank due to the shape of the interior wall of the fuel tank as a function of fuel depth at a selected measurement location within the fuel tank.

The measuring means further includes means for applying a voltage across the conductor and the pattern of resistance. The floating conductor and the pattern of resistance cooperate to provide a value of resistance corresponding to the depth of fuel in the fuel tank at the measurement location. The indicator means interprets that value of resistance to determine the instantaneous quantity of fuel in the fuel tank.

In preferred embodiments of the present invention, the pattern of resistance includes an electrically conductive path and a plurality of spaced-apart resistors electrically coupled in series along the path. The value of each resistor and the spacing between each pair of adjacent resistors along the path cooperate to define an electrical circuit model of the contour of the interior fuel tank wall. Calculated selection of the resistance values and resistance spacing encodes the pattern of resistance so that it represents either a linear or non-linear function matching the exact contour of the interior fuel tank wall.

The apparatus further includes means for moving the coded pattern of resistance within the fuel tank to position the resistance pattern in about a predetermined aligned relation to the contour of the interior fuel tank wall. In this way, the pattern of resistance is automatically positioned relative to a reference datum in close proximity to the bottommost wall of the fuel tank. Such an alignment operates to calibrate the apparatus in that the electrical model defined by the pattern of resistance is positioned to match the contour of the fuel tank, thereby permitting the floating conductor to rise and fall with the fuel level in the fuel tank while maintaining electrical contact with the coded pattern of resistance. The floating conductor provides an accurate indication of the depth of fuel in the fuel tank at the measurement location. In one preferred embodiment, the moving means comprises a fuel-sending unit submerged within fuel in the fuel tank and movable using fuel pressure generated by a fuel pump toward lowermost regions of the fuel tank.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 5 is an exploded assembly view of another embodiment of a fuel level-indicating continuity circuit having a predetermined pattern of resistance according to the present invention;

FIG. 6 is a top view of the embodiment illustrated in FIG. 5, following assembly thereof; and FIG. 7 is a schematic view of a resistive, fuel level-indicating continuity circuit having a resistance pattern coded to match the contour of the interior wall of the fuel tank in accordance with the present invention, showing the coded resistance pattern positioned within the fuel tank in aligned relation to the contoured interior wall thereof.

DETAILED DESCRIPTION OF THE DRAWINGS

Figure 1:
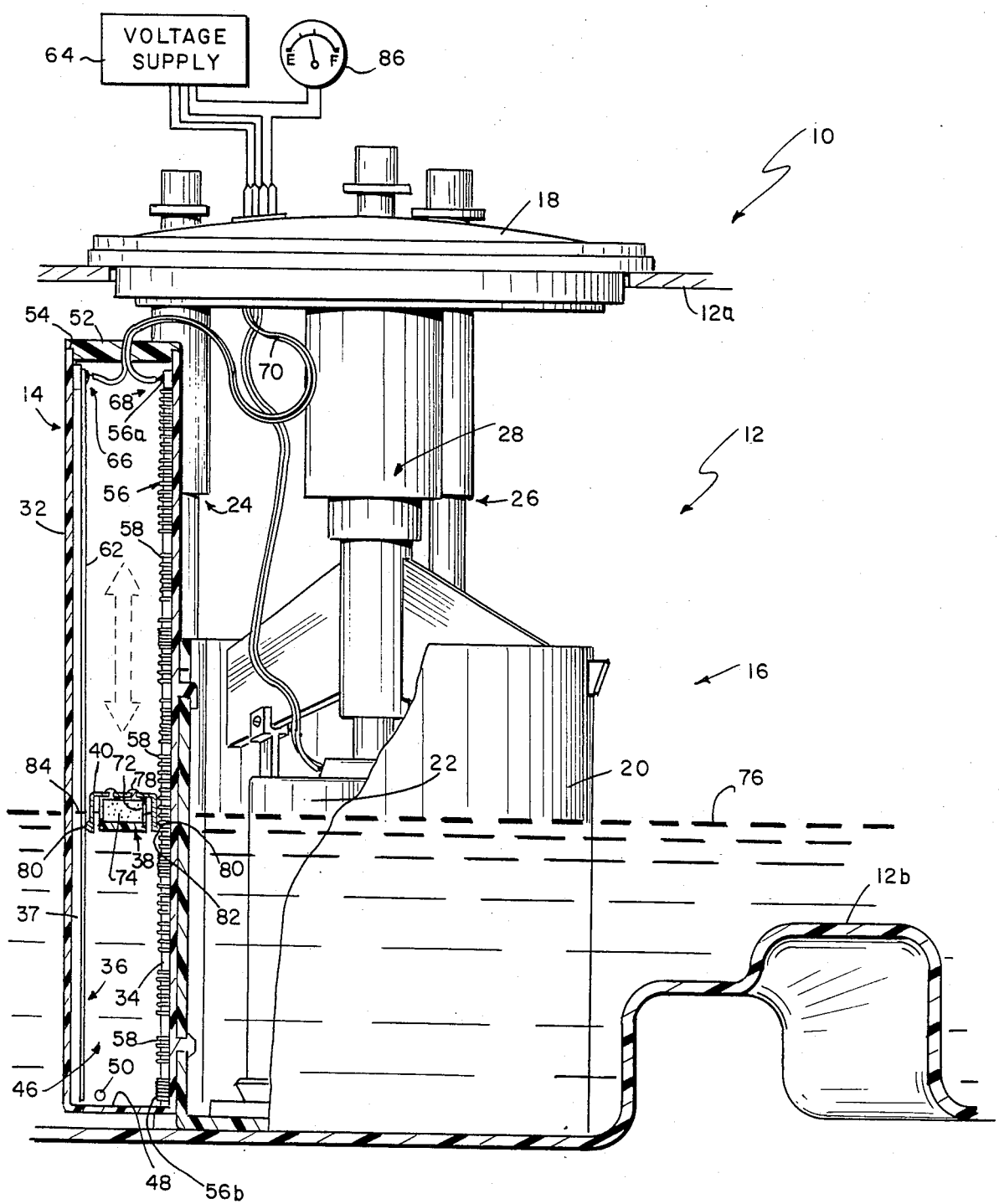
FIG. 1 is a side elevation view of one embodiment of a fuel gauge according to the present invention, with portions broken away, showing the fuel gauge submerged within a fuel tank having a contoured interior wall and registered in aligned relation therewith.

Fuel-measurement device 10 provides an easily serviceable, snap-assembly fuel gauge that is submersible within a fuel tank and automatically indexable relative to the bottom wall of the fuel tank using fuel pump pressure to provide a highly accurate, continuous indication of the quantity of fuel remaining in the fuel tank at low fuel levels. The novel fuel-measurement device 10 can be custom-designed to match a particular fuel tank configuration and employs a resistance-based electrical continuity circuit that is codeable to provide a selected linear or non-linear pattern of resistance representing the contour of the interior wall of the fuel tank and movable to an alignment position within the fuel tank to provide an electrical circuit model of the fuel tank. In addition, buoyant fuel depth-sensing elements of the fuel-measurement device are shielded within a quiescent region of fuel in the fuel tank to provide an accurate indication of the fuel depth undisrupted by fuel splashes or waves occurring during normal agitation and use of the fuel tank.

The fuel-measurement device 10 is submersible within a fuel tank 12 and desirably includes a fuel-level indicator and a fuel-sender unit. One embodiment 14 of a fuel-level indicator is illustrated in FIGS. 1-4, while a second embodiment 114 is illustrated in FIGS. 5 and 6. Reference is hereby made to a U.S. patent application Ser. No. 06/846,080, filed Mar. 31, 1986 and entitled: "Fuel Sender Unit," which application is filed simultaneously with the present application and assigned to the same assignee as the present invention, for a complete description of the structure and operation of a fuel-sender unit 16 suitable for use in the fuel-measurement device 10 of the present invention.

It will be appreciated by those skilled in the art that the fuel-level indicators 14, 114 or equivalents thereof are installable for operation independent of fuel-sender unit 16 and, could, for example, be rigidly fixed in a selected position within the fuel tank 12 and sized to extend between top and bottom walls 12a, b of the fuel tank 12. Advantageously, however, operation of the fuel-level indicator 14, 114 in combination with the automatically movable fuel-sender unit 16 permits the fuel-level indicator 14, 114 to be indexed relative to the bottom of the fuel tank to provide the most accurate indication of the quantity of fuel remaining in the fuel tank 12 when the fuel tank 12 is less than half full and the accuracy of said volume indication is most important to the fuel consumer.

Referring to FIG. 1, the fuel-sender unit 16 includes a top-mounting plate 18, a reservoir cup 20, a fuel pump 22, a fuel return tube assembly 24 for returning unused fuel from a vehicle engine (not shown), a fuel-siphon tube assembly 26 for draining fuel tank 12, and a fuel-delivery assembly 28 for conducting fuel pumped by pump 22 to a point of use. The fuel-delivery assembly 28 is configured to define adjustment means for yieldably biasing the reservoir cup and pump assembly against the deflectable bottom wall 12b of fuel tank 12 during fuel-pumping activity to maximize recovery of fuel from fuel tank 12 in the manner explained in greater detail in the above-referenced U.S. patent application entitled: "Fuel Sender Unit."

The fuel-level indicator 14 illustrated in FIGS. 1-4 includes a hollow housing 32, a coded wafer 34, a short-circuit wafer 36 including a wafer substrate 37, a buoyant member 38, and a continuity bridge 40. The length of the hollow housing 32 is substantially equivalent to the height of reservoir cup 30 as shown in FIG. 1. A pair of elongated depressions 42, 44 are formed in opposite walls of the hollow housing 32 to provide a home for receiving the pair of companion wafers 34, 36 as shown best in FIGS. 2 and 3. The wafers 34 and 36 are rigidly mounted in depressions 42 and 44, respectively, to lie in substantially spaced-apart parallel relation, thereby defining a space 46 therebetween for receiving buoyant member 38. The hollow housing 32 is formed to include a bottom wall 48 and a plurality of small-diameter inlet apertures 50 for admitting fuel into space 46 of the hollow housing 32. Small-diameter inlet apertures advantageously provide very slow response to fuel level variation in the fuel tank. A separate vented closure member 52 is provided for closing the top mouth 54 of hollow housing 32.

Coded wafer 34 is desirably made of a dielectric, ceramic material and extends along the interior length of hollow housing 32. In the illustrated embodiment, an electrically conductive wire strand 56 having a known resistance per unit length is wound about the coded wafer 34 to define a "pattern of resistance" representative of the contour of the interior wall of the fuel tank 12. The continuous wire strand 56 has first and second ends 56a, b and is arranged along the length of the coded wafer 34 to provide a plurality of serially connected windings 58 as shown best in FIG. 3. The variation in the transverse cross-sectional dimension of the coded wafer 34 affects the "size" and hence the value of resistance of each winding 58. Each winding 58 is characterized by a unique value of resistance functionally related to the relative position of that winding 58 along the length of the continuous wire strand 56. Thus, the transverse cross-sectional dimension of the coded wafer and the varying vertical spacings between pairs of adjacent windings 58 cooperate to define a "pattern of resistance" along the length of the coded wafer 34. In other words, the resistance of wire strand 56 varies along the length of coded wafer 34 to provide a coded pattern matching the contour of the interior wall of fuel tank 12 due to the special arrangement of the windings 58. It will be appreciated that such a pattern of resistance could be applied to coded wafer 34 using a variety of other techniques, including, but not limited to, printed circuit architecture.

One significant advantage of the above-described resistance pattern is that the coded pattern can be designed easily to represent either a linear or non-linear function indicative of the depth of fuel at a selected measurement location within the fuel tank 12. The resistance pattern is encodeable to represent virtually any fuel tank having a known "volume profile" in which the volume of the fuel tank varies linearly or non-linearly as a function of the fuel depth at a selected location due to the shape of the interior wall of the fuel tank.

Figure 3:
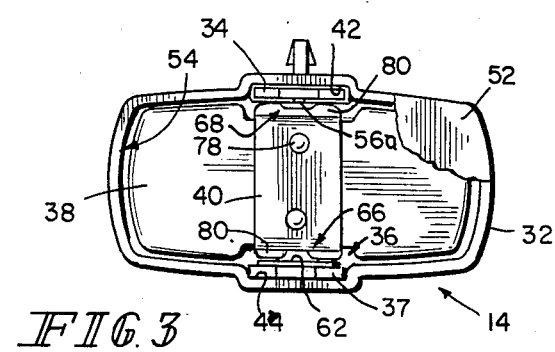
FIG. 3 is a top view of the portion illustrated in FIG. 2, following assembly thereof.
Figure 2:
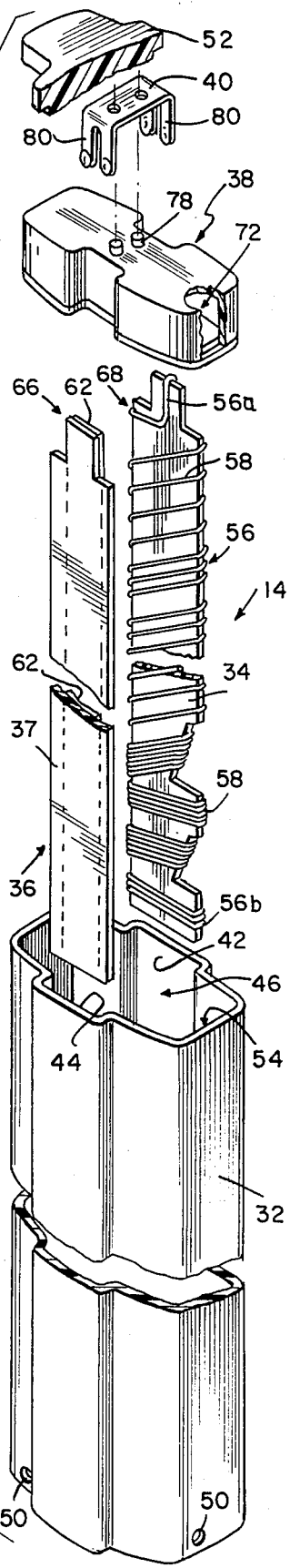
FIG. 2 is an enlarged, exploded assembly view of a portion of the fuel gauge illustrated in FIG. 1, showing one embodiment of a fuel level-indicating continuity circuit having a predetermined pattern of resistance.

Short-circuit wafer 36 provides an electrically conductive strip 62 shown in solid lines in FIGS. 1 and 3 and in dotted lines in FIG. 2. Conductive strip 62 can be either a separate element, attached in the illustrated manner, to a wafer substrate 37 made of a dielectric material, an integral portion of a wafer (not shown) made of an electrically conductive material, or some other suitable construction. The short-circuit wafer 36 is positioned in depression 44 to present conductive strip 62 toward the pattern of resistance defined by the windings 58 on the spaced-apart coded wafer as seen best in FIG. 1.

Referring to FIGS. 1 and 2, a voltage supply 64 and wire harness 70 are provided for applying a voltage across a negative terminal 66 electrically communicating with the upper end of conductive strip 62 and a positive terminal 68 electrically communicating with first end 56a of wire strand 56. Thus, the conductive strip 62 is grounded and a voltage is applied between the conductive strip 62 on the short-circuit wafer 36 and the coded resistance pattern 56, 58 on the coded wafer 34 via wire harness 70.

Buoyant member 38 and continuity bridge 40 cooperate to provide means for electrically contacting the conductor strip 62 and the pattern of resistance 56, 58, simultaneously, thereby defining a resistive continuity circuit illustrated in schematic form in FIGS. 1 and 7. The buoyant member 38 includes an interior chamber 72 filled with a buoyant medium 74 illustrated in FIG. 1 that is sufficient to cause buoyant member 38 to float at or about the top surface 76 of the fuel in fuel tank 12.

Continuity bridge 40 is an electrically conductive bracket attached to the top surface of buoyant member 38 using snap rivets 78 to present resilient conductive brushes 80 in opposite directions. These brushes 80 electrically contact each of the conductive strip 62 and the resistance pattern 56, 58. In use, one of the electrically conductive resilient brushes 80 remains in electrical contact with the grounded conductive strip 62, while the other brush 80 sweeps along the resistance pattern 56, 58 in a vertical direction in response to the rising and lowering fuel level in fuel tank 12 to define a continum of engagement points on the coded resistance pattern 56, 58. Each such engagement point (e.g., 82 in FIG. 1) corresponds to a fuel depth at the measurement location and represents a quantity of fuel in the fuel tank 12.

Figure 4:
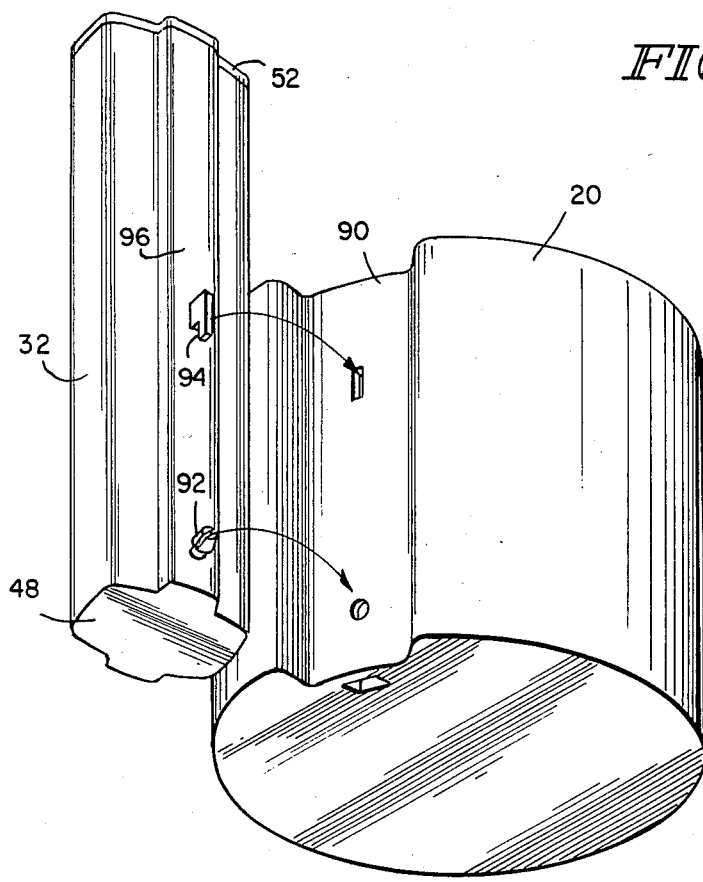
FIG. 4 is a perspective view of another portion of the fuel gauge illustrated in FIG. 1, showing assembly of a fuel level-indicating continuity circuit housing onto a fuel-sending unit reservoir.

Hollow housing 32 is mounted on reservoir cup 30 in the manner illustrated in FIG. 4. Reservoir cup 30 is formed to include an external channel 90 for receiving the hollow housing 32 therein. Snap pin 92 and lug 94 project away from an external wall 96 of hollow housing 32 to engage a hole and slot formed in the bottom wall of external channel 90. Thus, means is provided for detachably mounting the fuel-level indicator 14 to the reservoir cup 30 of the fuel-sender unit 16 for movement therewith.

In operation, fuel is admitted into space 46 of hollow housing 32 via inlet apertures 50. The continuity bridge 40 is buoyantly supported by buoyant member 38 at or about the top surface 84 of fuel in hollow housing 32. The conductive brushes 80 of the continuity bridge 40 move along conductor strip 62 and windings 58 in response to a change in the quantity of fuel in fuel tank 12 to define an electrical continuity circuit having a characteristic resistance indicative of the actual quantity of fuel in fuel tank 12. In particular, the characteristic resistance is defined by the resistance of the wire strand 56 per unit length and the length of wire extending from first end 56a and the point of engagement (e.g., 82 in FIG. 1) between one of the resilient brushes 80 and the windings 58. The value of said resistance varies in direct proportion to the number of windings 58 (i.e. length of wire) between the first end 56a and the engagement point. A volume indicator 86 of conventional type is provided for measuring and interpreting the characteristic resistance value to determine the instantaneous quantity of the fuel in the fuel tank 12.

The fuel level indicator 14 travels in the fuel tank 12 in the manner dictated by the moving reservoir cup 30 of the fuel sender unit 16. The fuel sender unit 16 operates to position the fuel level indicator 14 in close proximity to the bottom of fuel tank 12 so as to register the coded resistance pattern in aligned relation to the interior wall of the fuel tank and thereby calibrate fuel measurement device 10.

The fuel-level indicator 114 illustrated in FIGS. 5 and 6 includes an elliptically shaped hollow housing 116, an elongated rod 118 made of a dielectric material such as PYREX glass or a ceramics material, and first and second electrically conductive circuits 120 and 122 fixed along the length of the rod 118 as shown in FIG. 5. The elongated rod 118 is oriented within the housing 116 by means of a notch (not shown). The first circuit 120 includes a plurality of printed circuit resistors arranged to provide a coded resistance pattern similar in function to the resistance pattern described in connection with the embodiment of FIGS. 1-4. The second circuit 122 is a single strip of electrically conductive material similar in function to conductive strip 62.

Fuel-level indicator 114 also includes buoyant member 124 and continuity bridge 126. Buoyant member 124 is formed to include a central aperture 128 for slidably receiving rod 118 and an interior chamber 130 filled with a buoyant medium (not shown). Continuity bridge 126 is a semicircularly shaped electrical conductor having a pair of resilient electrically conductive brushes 132 presented in spaced-apart parallel relation to engage simultaneously first and second circuits 120, 122 to complete a resistive continuity circuit. Fuel-level indicator 114 operates in a manner similar to fuel-lever indicator 14 to indicate the instantaneous quantity of fuel remaining in the fuel tank.

Although the invention has been described in detail with reference to certain preferred embodiments, variations and modifications exist within the scope and spirit of the invention as described and defined in the following claims.

What is claimed is:

1. An apparatus for determining the quantity of fuel in a fuel tank, the fuel tank having a contoured interior wall, the quantity of fuel in the fuel tank being defined by the contour of the interior wall below the top surface of the fuel tank in the fuel tank, the apparatus comprising means for measuring the depth of fuel at a measurement location within the fuel tank, the measuring means including a buoyant member for floating on the top surface of the fuel in the fuel tank, a conductor supported on the buoyant member to float therewith, a non-linear pattern of fixed resistance in electrical contact with the conductor, the non-linear pattern of fixed resistance being coded to correspond to the volume of the fuel tank below a specified depth defined by the contour of the interior wall, and means for applying a voltage across the conductor and the non-linear pattern of fixed resistance, the conductor and the non-linear pattern of fixed resistance cooperating to provide a value of resistance at the measuring location that is proportional to the volume of the fuel tank below the measurement location, and indicator means for interpreting the resistance provided by the measuring means to determine the instantaneous quantity of fuel in the fuel tank based upon the volume of the tank below the measuring location.

2. The apparatus of claim 1, further comprising
a support fixture mounted on the tank, sending means for pumping fuel in the fuel tank to a point of use outside the fuel tank, the sending means being situated within the fuel tank, the measuring means being attached to the sending means for movement therewith, and extensible means for coupling the sending means to the support fixture so that the sending means and measuring means are movable in unison within the fuel tank during operation of the sending means, the extensible means operating to position and retain the non-linear pattern of fixed resistance in about a predetermined aligned relation to the interior wall of the fuel tank thereby calibrating the apparatus.

3. The apparatus of claim 1, wherein the non-linear pattern of fixed resistance represents a non-linear function corresponding to non-linear variation of the quantity of fuel in the fuel tank as a function of the depth of fuel at the measurement location so that the non-linear pattern of fixed resistance matches the contour of the interior wall of the fuel tank.

4. The apparatus of claim 1, wherein the non-linear pattern of fixed resistance includes an electrically conductive path and a plurality of spaced-apart resistors electrically coupled in series along the path, the value of each resistor and the spacing between each pair of adjacent resistors along the path cooperating to define an electrical circuit model of the contour of the interior wall.

5. The apparatus of claim 4, further comprising biasing means for moving the non-linear pattern of fixed resistance within the fuel tank to position the non-linear pattern of fixed resistance in about a predetermined aligned relation to the contour of the interior wall so that the electrical circuit model defined by the non-linear pattern of fixed resistance accurately represents the contour of the interior wall and the coded non-linear pattern of fixed resistance is situated to indicate the depth of fuel in a fuel tank at the measurement location accurately.

6. The apparatus of claim 1, further comprising shell means for substantially insulating the buoyant member and the conductor supported thereon from fuel splashes, waves, or the like occurring during agitation of the fuel tank so that the buoyant member floats in a substantially quiescent region of fuel at the measurement location to provide an accurate indication of the depth of fuel in the fuel tank at the measurement location.

7. The apparatus of claim 6, wherein the shell means includes a tubular container having opposite ends and positioned within the fuel tank, the tubular container including an interior wall defining a space between the opposite ends for receiving the buoyant member, the conductor, and the non-linear pattern of fixed resistance during floatation of the buoyant member on the top surface of the fuel as the depth of fuel at the measurement location varies, the tubular container being formed to include at least one opening at about at least one of the opposite ends to permit entry of fuel into the space without disrupting the substantially quiescent region of fuel.

8. An apparatus for detecting variation in the volume of fuel in a fuel tank having a predetermined volume profile, the apparatus comprising a first electrically conductive path defining a coded non-linear pattern of fixed resistance representative of the volume profile of the fuel tank, a second electrically conductive path in alignment with the first electrically conductive path, means for applying a voltage across the first and second electrically conductive paths, continuity means for establishing a value of resistance indicative of the instantaneous volume of fuel in the fuel tank, the continuity means including bridge means for electrically interconnecting the first and second electrically conductive paths to complete an electrical circuit having said value of resistance, float means for buoyantly supporting the bridge means in fuel in the fuel tank, the bridge means riding along at least the first electrically conductive path in substantial electrical contact with the coded non-linear pattern of fixed resistance in response to the rising and lowering level of fuel in the fuel tank to define said value of resistance, and means for measuring said value of resistance to determine the instantaneous volume of fuel in the fuel tank.

9. An apparatus for determining the quantity of fuel in a fuel tank, the fuel tank having a contoured interior wall, the quantity of fuel in the tank being defined by the contour of the interior wall below the top surface of the fuel in the fuel tank, the apparatus comprising volume simulation means for providing an electrically-conductive non-linear fixed resistance pattern corresponding to the volume of the fuel tank at a specified depth defined by the contour of the interior wall, the volume simulation means being submersible in the fuel tank and movable therein to position the conductive non-linear fixed resistance pattern at a measurement location within the fuel tank in about a predetermined, aligned relation to the interior wall to calibrate the apparatus, continuity means for electrically biasing the conductive non-linear fixed resistance pattern to provide a resistance corresponding to the depth of fuel in the fuel tank at the measurement location, float means for buoyantly supporting the continuity means in fuel in the fuel tank at the measurement location in electrically contacting relation to the conductive non-linear fixed resistance pattern, and indicator means for interpreting the resistance provided by the continuity means to provide an output that is proportional to the quantity of fuel in the fuel tank, the indicator means being electrically coupled to the conductive non-linear fixed resistance pattern and the continuity means to provide a resistive continuity circuit.

10. The apparatus of claim 9, further comprising
a support fixture mounted on the tank, sending means for pumping fuel in the fuel tank toward a point of use outside the fuel tank, the sending means being situated within the fuel tank, the volume simulation means being attached to the sending means for movement therewith, and extensible means for coupling the sending means to the support fixture so that the sending means and the volume simulation means are movable in unison within the fuel tank during operation of the sending means, the extensible means operating to position and retain the non-linear pattern of fixed resistance in about a predetermined aligned relation to the interior wall of the fuel tank thereby calibrating the apparatus.

11. The apparatus of claim 9, wherein the non-linear pattern of fixed resistance represents a non-linear function corresponding to non-linear variation of the quantity of fuel in the fuel tank as a function of the depth of fuel at the measurement location so that the non-linear pattern of fixed resistance matches the contour of the interior wall of the fuel tank.

12. The apparatus of claim 9, wherein the float member floats on the top surface of the fuel, and the continuity means includes a conductor supported on the float member to float therewith and means for applying a voltage across the conductor and the non-linear pattern of fixed resistance to provide said resistance.

13. An apparatus for determining the quantity of fuel in a fuel tank, the fuel tank having a contoured interior wall, the quantity of fuel in the fuel tank being defined by the contour of the interior wall below the top surface of the fuel in the fuel tank, the apparatus comprising
a first conductor within the fuel tank, the first conductor including resistance means for providing a coded non-linear pattern of fixed resistance matching the contour of the interior wall, the coded non-linear pattern representing the volume of the fuel tank as a function of the depth of the fuel tank at the measurement location,
a second conductor within the fuel tank in spaced-apart relation to the first conductor,
bridge means for simultaneously coupling the spaced-apart first and second conductors in electrical communication, the bridge means including sweep contact means for continuously engaging the resistance means during movement of the bridge means within the fuel tank, the sweep contact means and the resistance means cooperating to define a continuum of engagement points on the coded non-linear pattern, each engagement point corresponding to a depth at the measurement location and representing a quantity of fuel in the fuel tank,
a voltage source for applying a voltage across the first and second conductors, the voltage source having two electrodes, a first electrode electrically communicating with the sweep contact means of the bridge means and the second electrode being grounded,
means for grounding the second electrode,
float means for buoyantly supporting the bridge means in fuel in the fuel tank, the sweep contact means being moved on the resistance means to an engagement point corresponding to the actual quantity of fuel in the fuel tank in response to movement of the floating bridge means as the depth of fuel in the fuel tank at the measurement location varies due either to drainage of fuel from the fuel tank or introduction of fuel into the fuel tank, said engagement point defining a continuity circuit having a characteristic resistance indicative of the actual quantity of fuel in the fuel tank, and
measurement means for interpreting the characteristic resistance to determine the quantity of fuel in the fuel tank.

14. The apparatus of claim 13, further comprising shell means for substantially insulating the buoyant member and the conductor supported thereon from fuel splashes, waves, or the like occurring during agitation of the fuel tank so that the buoyant member floats in a a substantially quiescent region of fuel at the measurement location to provide an accurate indication of the depth of fuel in the fuel tank at the measurement location.

15. The apparatus of claim 13, wherein the coded non-linear pattern defined by the resistance means represents a non-linear function corresponding to non-linear variation of the quantity of fuel in the fuel tank as a function of the depth of fuel at the measurement location so that the non-linear pattern of fixed resistance matches the contour of the interior wall of the fuel tank.

16. The apparatus of claim 13, wherein the non-linear pattern of fixed resistance includes an electrically conductive path and a plurality of spaced-apart resistors electrically coupled in series on the path, the value of each resistor and a space in between each pair of adjacent resistors on the path cooperating to define an electrical circuit model of the contour of the interior wall.

17. The apparatus of claim 16, further comprising adjustable biasing means for moving the coded non-linear pattern within the fuel tank to position the coded non-linear pattern in about a predetermined aligned relation to the contour of the interior wall so that the electrical circuit model defined by the coded non-linear pattern accurately represents the contour of the interior wall and the coded non-linear pattern is situated to indicate the depth of fuel in the fuel tank at the measurement location accurately.

18. The apparatus of claim 13, wherein the first conductor includes a first elongated wafer made of a dielectric material and an electrically conductive circuit fixed on the wafer to extend along the length of the wafer, the electrically conductive circuit being configured to define the coded non-linear pattern, and the second conductor includes a second elongated wafer made of an electrically conductive material.

19. The apparatus of claim 18, further comprising a hollow tube positioned in the fuel tank, the hollow tube including an interior wall defining a space in communication with fuel in the fuel tank, and wherein the first and second wafers are fixed to the interior wall in opposed relation to one another, and the bridge means and the float means are buoyantly supported on the top surface of fuel in the space for movement within the hollow tube in response to rising or lowering level of fuel in the hollow tube.

20. The apparatus of claim 13, further comprising an elongated rod made of dielectric material, and wherein the first conductor includes a first electrically conductive circuit fixed along the length of the rod and configured to define the coded non-linear pattern, and the second conductor includes a second electrically conductive circuit fixed along the length of the rod in oppositely-facing relation to the first electrically conductive circuit.

21. The apparatus of claim 20, further comprising a hollow tube positioned in the fuel tank, the hollow tube including an interior wall defining a space in communication with fuel in the fuel tank, and wherein the rod is fixed within the space in spaced-apart relation to the interior wall to define an annular passageway, and the bridge means and the float means are configured to slide in the annular passageway and are buoyantly supported on the top surface of fuel in the annular passageway for movement within the hollow tube in response to the rising or lowering level of fuel in the hollow tube.

* * * * *